United States Patent [19]
Sachs et al.

[11] Patent Number: 6,070,973
[45] Date of Patent: Jun. 6, 2000

[54] NON-RESONANT AND DECOUPLED DROPLET GENERATOR

[75] Inventors: Emanuel Sachs, Newton; James G. Serdy, Boston, both of Mass.

[73] Assignee: Massachusetts Institute of Technology, Cambridge, Mass.

[21] Appl. No.: 08/856,515

[22] Filed: May 15, 1997

[51] Int. Cl.[7] .................................................. B41J 2/02
[52] U.S. Cl. ............................................................ 347/75
[58] Field of Search ................................ 347/68, 75, 54; 239/102.2

[56] References Cited

U.S. PATENT DOCUMENTS

| | | | |
|---|---|---|---|
| 3,667,678 | 6/1972 | Haskell | 239/102 |
| 3,840,758 | 10/1974 | Zoltan | 310/8.1 |
| 3,848,118 | 11/1974 | Rittberg | 239/101 |
| 3,857,049 | 12/1974 | Zoltan | 310/8.1 |
| 3,958,249 | 5/1976 | DeMaine et al. | 346/1 |
| 3,963,151 | 6/1976 | North | 222/309 |
| 3,979,756 | 9/1976 | Helinski et al. | 346/1 |
| 4,245,225 | 1/1981 | Fillmore et al. | 346/75 |
| 4,272,773 | 6/1981 | Halasz . | |
| 4,306,245 | 12/1981 | Kasugayama et al. . | |
| 4,308,546 | 12/1981 | Halasz | 346/140 R |
| 4,370,662 | 1/1983 | Hou et al. | 346/75 |
| 4,388,627 | 6/1983 | Umezawa | 346/75 |
| 4,395,719 | 7/1983 | Majweski et al. | 347/68 |
| 4,418,354 | 11/1983 | Perduijn | 346/140 R |
| 4,499,479 | 2/1985 | Lee et al. | 346/140 R |
| 4,523,202 | 6/1985 | Gamblin | 346/75 |
| 4,599,626 | 7/1986 | Rich | 346/140 R |
| 4,625,373 | 12/1986 | Duffield et al. | 29/25.35 |
| 4,630,072 | 12/1986 | Scardovi et al. . | |
| 4,641,155 | 2/1987 | Zoltan | 346/140 R |
| 4,698,644 | 10/1987 | Drago et al. | 346/140 R |
| 4,714,932 | 12/1987 | Reynaud | 346/75 |
| 4,727,379 | 2/1988 | Sourlis et al. | 346/75 |
| 4,746,929 | 5/1988 | Lin et al. | 346/75 |
| 4,901,092 | 2/1990 | Moriyama | 346/140 R |
| 5,039,598 | 8/1991 | Abramsohn et al. | 430/347 |
| 5,063,393 | 11/1991 | Clark et al. | 346/75 |
| 5,196,860 | 3/1993 | Pickell et al. | 346/75 |
| 5,645,377 | 7/1997 | Kauschinger et al. | 405/269 |

OTHER PUBLICATIONS

1 International Preliminary Examination Report for PCT/US98/09341, Jun. 17, 1999.

Primary Examiner—N. Le
Assistant Examiner—Shih-wen Hsieh
Attorney, Agent, or Firm—Steven J. Weissburg

[57] ABSTRACT

A droplet generator and ink jet printhead assembly employing the droplet generator are disclosed. The droplet generator can operate with a wide range of fluids over a wide range of conditions, is easily serviced, and can be easily integrated into a machine such as a Three Dimensional Printing machine. The assembly includes a nozzle having an orifice, a liquid reservoir or supply for containing a liquid to be emitted from the nozzle and a non-resonant elastically deformable fluid conduit for conveying the liquid from the liquid reservoir to the nozzle. A transducer is disposed in abutting relation with the fluid conduit a predetermined distance from the nozzle. The transducer is energized by a suitable electrical signal, such as a sinusoidal signal. The transducer causes compression of the conduit and provides a wave which propagates along the fluid conduit and fluid contained therein toward the nozzle and orifice. This wave acts to perturb the stream formed at the orifice and to initiate the break-up of the stream into droplets. The utilization of an elastically deformable non-resonant conduit between the transducer and the nozzle mechanically decouples the nozzle from the remainder of the printhead assembly and provides filtering of undesired frequencies which might otherwise be imparted to the fluid and the nozzle.

52 Claims, 8 Drawing Sheets

NON-RESONANT AND DECOUPLED DROPLET GENERATOR

GOVERNMENT SUPPORT

This invention was made with government support under Grant Number DDM-921578, issued by the National Science Foundation. The U.S. Government has certain rights in this invention.

FIELD OF THE INVENTION

This invention relates to continuous-jet ink-jet printing and more particularly, to a non-resonant droplet generator employed in ink-jet printing.

BACKGROUND OF THE INVENTION

A continuous-jet ink-jet printhead consists of a device which creates a train of droplets and devices for steering and catching these droplets. The devices for steering and catching the droplets control which droplets impact upon the surface being printed and, in some cases, control the impact position of the droplets. In continuous-jet printing, a stream of liquid is forced out of a nozzle under pressure in a continuous stream. Such a stream has a natural tendency to break up into a stream of droplets in order to reduce the surface energy of the stream. This break-up is most favorable at a particular frequency. For invicid fluids, this frequency is called the Rayleigh frequency and is given by:

$$\text{Rayleigh frequency} \cong \frac{1}{4.51} \frac{V}{D}$$

where V is the velocity of the fluid in the jet, D is the diameter of the nozzle and the frequency is in Hertz.

In the absence of an externally applied perturbation, the stream will break up at a frequency near to the Rayleigh frequency, but with irregularly sized droplets. In order to create a regular break up, the standard practice is to apply a regular perturbation to the stream at or near the Rayleigh frequency. The droplets are then formed at the same frequency as the perturbation applied to the stream. A common problem with this approach is the formation of satellite droplets which are small, undesired droplets which can form between the larger, desired droplets as a by-product of the formation of these larger droplets. As the filamentary region between the large droplets decreases in diameter and a large droplet breaks free of the stream, the filamentary region can itself detach and collapse into a small droplet, thus forming a satellite droplet. The details of the shape of the filamentary region during droplet detachment are crucial to avoiding or controlling such satellite droplets.

The most common method for creating a perturbation to the stream is to use a piezo active material which is excited by an oscillating electrical signal at the desired frequency, resulting in a mechanical motion of the piezo material. In most droplet generators the piezo device is mounted to a structure which is caused to vibrate and this structure in combination with the piezo has a mechanical resonance at the desired frequency of operation. By such resonant operation a large amplitude of oscillation of the mechanical structure may be gained. In one type of resonant droplet generator the mechanical resonator is of the form of a rod which is caused to vibrate up and down within a fluid cavity and with its end some distance above the entrance to a nozzle orifice. The motion of the rod causes a perturbation to the stream by acoustic coupling through the fluid and this acoustic coupling must be designed.

In a second type of resonant droplet generator the body of the droplet generator is itself the mechanical resonator. The resonator body is fabricated of stainless steel and the orifices are in a linear array on an orifice plate which is bonded to the resonator body with adhesive. The orifice plate is typically made of nickel by an electroforming process. In this case, the motion of the resonant structure causes the orifice itself, which is bonded to the bottom of the resonant structure, to vibrate up and down, and by this primary mechanism, a regular perturbation is applied to the stream. Such generators may also have the undesirable effect of coupling the vibration of the body to the stream through the fluid within the body.

A common problem with all excitation driven droplet generators is the formation of satellite droplets. Satellite droplet formation is both the consequence of jet stream perturbations prior to break up and of fluid properties such as viscosity and surface tension and specific gravity during drop separation. Common water and solvent based inks can vary in density from 0.85 to 2.0 gm/cm3, with viscosities varying from 1 to 10 centipoise and surface tension varying from 20 to 80 dyne/cm. Flow rate, excitation frequency and wave form, drive amplitude, and temperature are among the variables which affect the formation of droplets during break-off. However, if (as is conventional practice) the excitation frequency approximates the natural or Rayleigh frequency for a given orifice and flow rate, then satellites for any Newtonian fluid are known to appear in the following sequence as a function of the energy applied to that nozzle in the form of piezo excitation voltage. At the lowest level of excitation necessary to initiate drop formation, "slow" or rearward merging satellites will appear (rearward merging satellites will move toward and join the main droplet which is closer to the nozzle—to the rear in the direction of flow). During this mode of operation, unwanted charge variations occur as rearward merging satellites transfer part of the charge from their parent forward drop to the following drop when merging occurs. As the excitation level increases, intermediate or infinite satellites appear which do not merge at all, and depending upon the application, can interfere with proper printing. Further increase in the piezo drive amplitude will result in "fast" or forward merging satellites (forward merging satellites will move toward and join the main droplet which is further from the nozzle—forward in the direction of flow). Forward merging satellites produce a satellite free stream entering the deflection field and permit precise placement of drops on the print substrate. Additional increase in piezo excitation will precipitate a condition known in the art as "drop separation fold back" accompanied by a lengthening of break-off and phase sequence reversal, ie. an abrupt transition from forward to rearward merging. Virtually all nozzles used for continuous-jet ink jet printing exhibit these satellite patterns and piezo drive is the principal variable governing the resolution of satellites into rearward, forward or infinite modes. Furthermore, there is a direct relationship between excitation frequency and excitation drive. Within certain limits, any departure from the Rayleigh frequency can be compensated with increased excitation. Conversely, any approximation to the natural break-off frequency will create the same breakoff condition with reduced excitation.

Problems arise for droplet generators based on mechanical and/or fluid resonance because their ability to impart energy to the jet stream is narrowly frequency dependent. Small departures from the tuned frequencies of these devices require large increases in the drive voltage required to maintain the same level of excitation. As a result, a given mechanically resonant device can operate over only a small range of nozzle size and flowrate. The useful stable flowrate range of operation for a given orifice is much broader than the range for drive compensation in a mechanically resonant droplet generator. Fluid resonant devices encounter difficulties accommodating the wide range of acoustic properties of water and solvent based inks, and any harmonic or attenuating effects of operating off frequency.

In the prior art, efforts have been made to attenuate all resonances by coupling the excitation source and fluid through "acoustically soft" materials as in U.S. Pat. No. 4,727,379. Since this device is non-resonant over its entire useful range of operation, it is capable of ranging in frequency in order to support the Rayleigh frequency range of any given orifice and flowrate. However, this device relies on the acoustic properties of the fluid to impart energy to the jetting stream, which makes it fluid specific with respect to the geometry of the fluid cavity. If the energy which is transmitted through the fluid conduit directly to the fluid stream does not closely match the fluid resonance frequency of the ink cavity then anti-resonances result which are destructive to the desired standing wave at fluid resonance. The drive voltage necessary to operate a nozzle in which the excitation energy is fluid coupled rises rapidly in the region between resonance and anti-resonance. Small changes in fluid properties or in frequency drift can result in a shift between fluid resonance and anti-resonance. U.S. Pat. No. 5,063,393 is a later refinement in which a hybrid multi-resonant fluid chamber is fabricated from "acoustically soft" materials in order to support several fluid resonances in the region of the system operating frequency. Through this means the nozzle response is flattened, and the region of forward merging satellite free operation is broadened to include commonly used inks with differing acoustic properties. Commonly used water and solvent based inks have sound propagation rates ranging from 1000 to 1650 m/s.

U.S. Pat. No. 5,196,860 provides a nozzle control system which monitors the condition of satellite drops and the drop break-off point in order to compute and apply a satisfactory range of nozzle drive voltages that will maintain operation of an ink jet printer in the favorable region between forward merging satellites and drop separation fold back, regardless of ink type and temperature.

In a "Rapid Prototyping" technique know as Three Dimensional Printing described in U.S. Pat. No. 5,204,055 a component is defined on a layer-by-layer basis. Each cross section of a CAD model is created by spreading a thin layer of powder or particulate material in a predefined region, usually over the top of a piston. The pattern within the layer is created by ink-jet printing a binder material which serves to bind or bond the particles in an intended pattern. Successive layers of particles are applied and selectively bonded within and between layers to build up, layer by layer, a three dimensional structure. This technique is used for rapid prototyping of tooling and molds and other objects, and can also be used for producing finished production objects.

The nature of the binder material varies widely from application to application and often includes the use of colloids and slurries of particles in suspension. For example, colloidal silica binder is printed into alumina powder to create ceramic molds for metal casting. Binders of a wide range of chemical species may be printed as well, ranging from highly acidic to highly basic aqueous media and including a wide range of organic solvents such as alcohols, acetone and chlorinated solvents such as chloroform.

In a typical arrangement, the powder layers are spread over the top of a piston and the piston is lowered one layer thickness prior to the spreading of each layer, thereby maintaining the top of the bed of powder at a specified height. The ink-jet printhead is typically a continuous-jet type of printhead with an array of nozzles arranged in a row. The printhead is mounted to a carriage which is moved over the powder bed in a raster pattern. The combination of this raster pattern with the ability to turn the printhead on and off, defines the pattern of each layer. The raster scanning pattern is achieved by a reciprocating motion on one axis and this axis is then translated over the powder bed to achieve the second axis of the raster pattern. Typically, the printhead is accelerated at 20 m/sec$^2$ (2 g's) during the turn-around portions of the reciprocation and moves at a velocity of 1.5 meter/sec as it sweeps across the powder bed.

In view of the particular requirements on ink-jet printing of the Three Dimensional Printing process, the standard methods of construction of droplet generators are unsatisfactory in a number of key regards.

The materials of construction of current droplet generators are often limited by the need to achieve particular geometries and the wetted materials may be incompatible with particular binders. For example, one droplet generator employs an electroformed nickel orifice plate which will not tolerate corrosive or abrasive binders. Some of the highly acidic binders will corrode stainless steel, the main material of construction of most droplet generators. Further, the typical construction involves the use of gaskets, seals and adhesives in wetted contact with the binders, all of which pose serious problems to handling a wide range of binder materials.

The typical construction uses a chamber and such chambers can have regions of fluid stagnation where little or no fluid flow takes place. Such stagnant fluid flow can lead to nucleation, agglomeration or settling of colloidal or slurry based binders. Stagnant regions can lead to difficulties in cleaning a fluid out of a chamber or in switching from one binder type to another without a potentially undesired mixing of the two binder types. In order to scale up the production rate of the Three Dimensional Printing process it will be desired to create printheads and droplet generators with operative widths as large as the powderbed, potentially several meters in extent. In the design and manufacture of droplet generator based on mechanical resonance, great care must be exercised in order to avoid unwanted mechanical resonances. This problem is especially acute in printheads of greater widths and may become practically impossible for the widths of printhead needed for the Three Dimensional Printing process. A droplet generator based on a mechanically resonant structure must be operated at its resonant frequency and can become inoperative with even small differences in frequency away from the resonant frequency. However, as the carriage which creates the raster motion of the printhead over the powderbed will inevitably have some small variations of velocity as it sweeps over the powderbed, it may be desirable to slightly vary the frequency of the droplet generation so as to maintain synchrony of droplet generation with position of the printhead over the powderbed.

In most applications of continuous-jet ink-jet printing, the printhead is substantially stationary and the paper or other product on which ink is to be deposited is transported past the stationary head. Thus the design of conventional printheads for ink jet printers need not accommodate a transport mechanism for moving the head across a working surface and the printhead is often quite large and massive. As noted, In the Three Dimensional Printing process, the printhead is often reciprocated at high speeds and high accelerations.

Thus, printheads of the usual construction would severely limit the width of printhead that could be used, simply due to the size and especially the mass of the printhead.

Adapting a commercial printhead intended for stationary operation also presents problems for fluid support. Pressure surges can result from the acceleration of fluid in nozzle chambers and manifolds in direct communication with orifices and cause fluctuations in stream break-off and phase stability. The serviceability of large numbers of nozzles in one unit is extremely difficult when jetting materials with a tendency to settle, agglomerate or nucleate. Any problems associated with the failure of a single jet place the entire array at risk since disassembly and cleaning procedures tend to dislodge particulates from seals and recessed areas and cleaning solutions often react with residual printing fluids. Attempts to restart a multiple jet printhead of this type are usually difficult.

SUMMARY OF THE INVENTION

In accordance with the present invention, a droplet generator is provided which has a fluid conduit or tube of elastically deformable material which is substantially non-resonant over an intended frequency range. One end of the fluid conduit is in fluid communication with a nozzle which terminates in an orifice. A transducer such as a piezo active material confronts or surrounds the fluid conduit at a position spaced from the nozzle by a predetermined distance and is separated from the working fluid by the fluid conduit. The transducer is energized by a suitable electrical signal, such as a sinusoidal signal. The transducer is operative to cause radial compression of the fluid conduit and to provide a wave which propagates along the fluid conduit and ink contained therein toward the nozzle and orifice. This wave acts to perturb the stream formed at the orifice and to initiate the break-up of the stream into droplets of regular size and spacing. The spacing along the fluid conduit between the transducer and the nozzle provides filtering of unwanted frequencies.

A plurality of droplet generators of the type presently described may be employed in a printhead which is especially useful for three dimensional printing systems used for multi-layer manufacturing. The printhead comprises an array of droplet generators arranged in one or more rows across an intended width. In a preferred embodiment, each droplet generator is its own independent unit comprised of a nozzle, a fluid delivery conduit and a device for stimulating and controlling the formation of droplets and each may be independently serviced. The generated droplets can be steered or deflected along a path between the nozzle tips and work surface by providing a charged field or by use of charged plates in a manner known in the art.

The droplet generators of the current invention offers advantages in; i) the range of fluids that can be used, ii) the range of conditions over which the device can operate, iii) the ease with which the device can be integrated into a machine, iv) and the ease with which it can be serviced.

BRIEF DESCRIPTION OF THE DRAWING

The present invention will be more fully understood by reference to the following Detailed Description of the Invention in conjunction with the drawing of which.

DETAILED DESCRIPTION OF THE INVENTION

In accordance with the present invention, a droplet generator is disclosed which is particularly suitable for use in a multi-layer manufacturing technique known as Three Dimensional Printing. The presently disclosed droplet generator is also useful for applying ink or any other suitable liquid to a writing or other confronting surface. Additionally, the presently disclosed droplet generator may be employed as a fuel injector or in other applications employing a droplet generator.

Figures 1, 2:
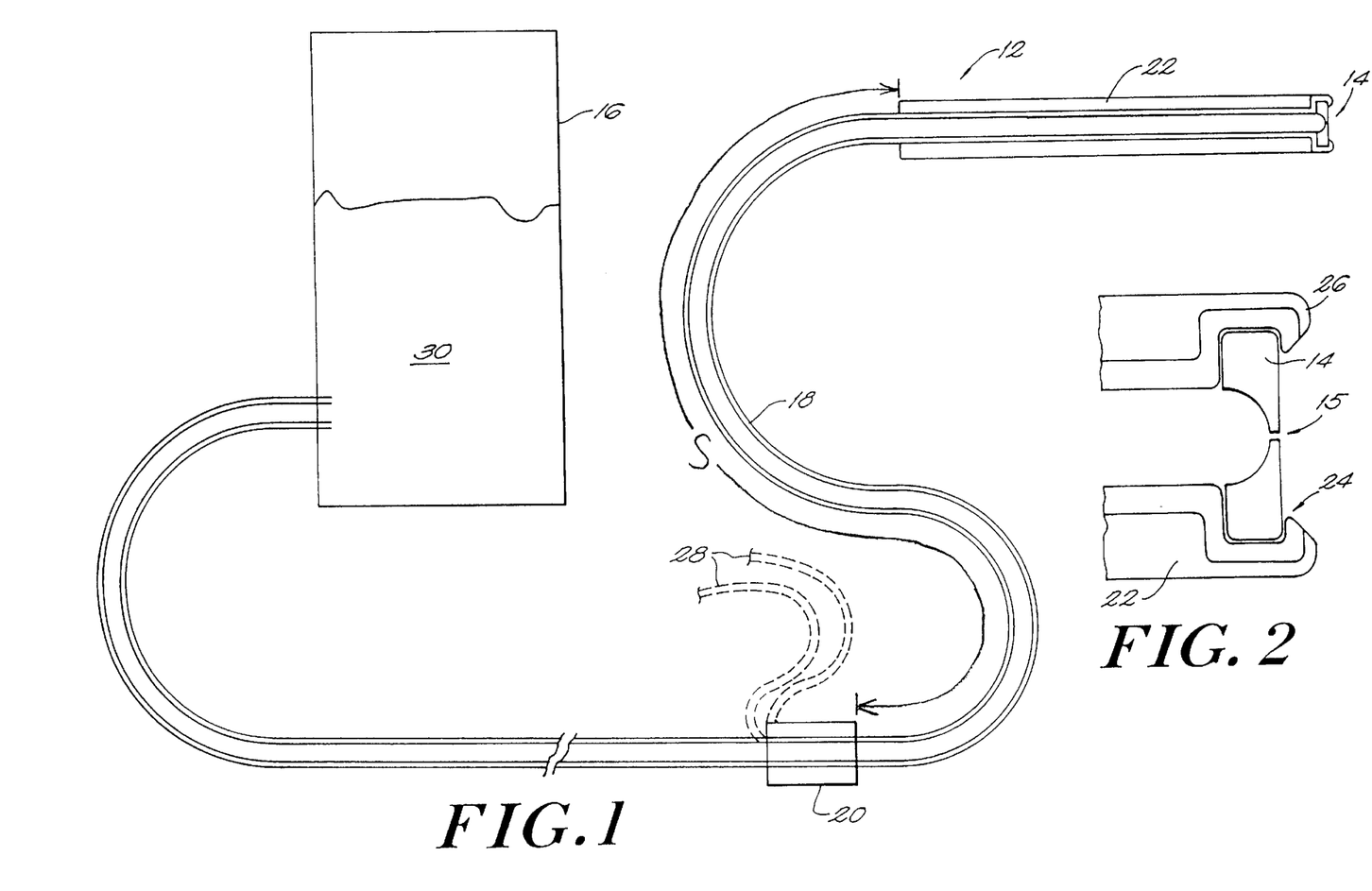
FIG. 1 is a diagrammatic illustration of an droplet generator in accordance with the present invention.
FIG. 2 is an expanded view of the forward portion of the nozzle of the droplet generator of FIG. 1.

Referring to FIG. 1 a preferred embodiment of the droplet generator includes a nozzle 12, which terminates in disk 14 having an orifice 15, a reservoir or fluid supply 16 and a fluid conduit or tube 18 coupling the fluid supply 16 to the nozzle 12. A transducer 20, such as a piezoelectric transducer, surrounds the fluid conduit 18 and is disposed about the fluid conduit a predetermined distance S from the nozzle 12. Typically, the length of the fluid conduit between the reservoir and the transducer is substantially greater than the length of the fluid conduit between the transducer and the nozzle.

The fluid supply 16 contains an ink composition which can be a solution, colloid, slurry, water, solvent, or a molten material such as wax. The term "ink" is used herein broadly to refer to any liquid which can be dispensed or emitted by a printhead nozzle.

The fluid conduit 18 comprises an elastically deformable material which is capable of sustaining the propagation of an elastic wave, but is non-resonant over a defined frequency range. In a preferred embodiment, a flouropolymer such as Teflon may be used for its properties of chemical resistance. For example, a #24LW TFE (Teflon) tube from Zeus Industrial Products, Inc. which has a 0.034 inch outside diameter and a 0.020 inch nominal inside diameter can be used. Referring to FIGS. 1 and 2 the nozzle 12 may comprise a two part assembly having a ceramic, ruby, or sapphire disk 14 having an orifice 15 mounted within a body portion 22. In a preferred embodiment, the body portion 22 of the nozzle 12 is fabricated of a stainless steel sleeve having a nominal 1/16 inch outer diameter. The inner diameter is sized to accept a Teflon capillary, such as a capillary with outer diameter of 0.034 inch. One end of the body portion 22 has a recess 24 machined or otherwise formed therein to a typical diameter of 0.054 inch. This diameter of this counterbore is sized to form a gasketed fluid seal between the flared end of the Teflon capillary fluid line and the ruby disk orifice. The base of the counterbore acts as a seat for the ruby disk orifice. After assembly, the nozzle tip 26 may be rolled, or swaged in order to further aid in retaining and sealing the ruby orifice.

A transducer 20 is supplied a distance S from the nozzle for the purpose of inducing the perturbations which lead to break-up of the liquid stream to form droplets. In a preferred embodiment, the transducer is a length of cylindrical piezo active ceramic material such as a Lead-Zirconium-Titanate (PZT) ceramic. A suitable material is PZT-5H from Morgan-Matroc Corp. of Bedford, Ohio. The internal diameter of the piezo transducer is chosen to provide an interference fit with the elastically deformable conduit 18. For example a piezo transducer with inner diameter of 0.030 inch can be used with an elastically deformable fluid conduit of 0.034 inch outer diameter. The piezo transducer diameter may be 0.050 inch and a length (in the direction of fluid flow) of 0.15 inch can be used. The piezo transducer is metallized on the inner and outer surfaces. The piezo transducer is assembled to the fluid conduit 18 by stretching the conduit and drawing it through the piezo transducer 20. Releasing the tension on the fluid conduit allows the fluid conduit to relax and conform to the inner diameter of the piezo transducer 20. Electrical contacts are made to the metallized surfaces on the piezo transducer 20 with fine wires 28 compressed between the inner diameter of the piezo and the outer diameter of the fluid conduit 18, and between the outer diameter of the piezo and a shrink wrap sleeve applied around it.

During operation, a pressure is applied to the fluid 30 in the reservoir 16, for example by means of the application of pressurized gas to the reservoir 16 (not shown). The pressure needed will depend on the size of the orifice 15 in the disk 14, on the desired stream velocity, and on the properties of the fluid 30. Typically the pressure will be approximately 2 atmospheres above atmospheric pressure. Such a pressure would result in a stream of approximately 10 meter/sec velocity to be emitted from a 50 micron diameter orifice for liquids with viscosities in the range of 2 centipoise.

A periodic voltage signal is applied by a waveform generator or any other suitable waveform source to the metallized regions of the piezo transducer 20 by means of the wires 28. The frequency of the signal will determine the frequency of droplet break-off and this will typically be close to the Rayleigh frequency for the stream. For example, for a stream emitted from a 50 micron diameter orifice at a velocity of 10 meters/second, a frequency of 45 kilohertz might be typical. However, a particular virtue of the current invention is the ability to create a suitable droplet stream over a range of frequencies, which may deviate considerably from the Rayleigh frequency. The amplitude of the applied sinusoidal signal will typically lie in the range of 10–100 Volts. This amplitude may be adjusted to achieve the desired break-off characteristics and specifically to avoid the formation of infinite or rearward merging satellites. The amplitude is limited by the de-poling characteristic of the piezo transducer 20 which depends on the physical size of the element and the material properties of the piezo.

The application of a voltage to the piezo transducer 20 leads to both a change in the diameter of the device and a change in its length. The change in diameter of the piezo transducer 20 causes the diameter of the elastic fluid conduit 18 within it to change and results in deformation of the fluid conduit. Note that the elastic fluid conduit 18 is in contact with the inner wall of the piezo 20 because, in a preferred embodiment, it is assembled as an interference fit and further the fluid pressure within the elastic fluid conduit tends to push the fluid conduit outward and maintain this contact. Changes in the coupling between the piezo 20 and fluid conduit due to creep are evidenced by a 'forming period' during startup. Typically, during startup, when fluid pressure is introduced to the fluid conduit and drive to the piezo 20, the stream, as observed by strobed light synchronized to the piezo, will undergo a 10–20 sec. transformation. This transformation will include the progression through rearward and infinite to forward merging satellites, accompanied with shortening break off length to 4–6 nodes. The presently disclosed droplet generators have been observed to return to their previous characteristic break-off following long idle periods, and to operate for extended periods with stable breakoff phase without changes in excitation. This change in fluid conduit diameter acts as the initiation of a traveling wave which propagates down the combination of elastic fluid conduit and fluid within it toward the nozzle. Upon arrival at the nozzle, the fluctuations in fluid pressure and velocity create a disturbance to the fluid stream which is emitted from the orifice 15 of the disk 14 within the nozzle 12. This perturbation then grows and results in the pinch-off of the stream and the formation of droplets.

There are several possible modes of wave propagation in a flexible fluid conduit filled with liquid. For example a wave may propagate through the fluid alone, through the walls of the conduit alone or by a mechanism which involves both the conduit and the fluid within it. Further, different types of wave propagation are possible even within a given medium. For example, a wave propagating down a fluid conduit can either be of a longitudinal or transverse nature.

Figure 3:
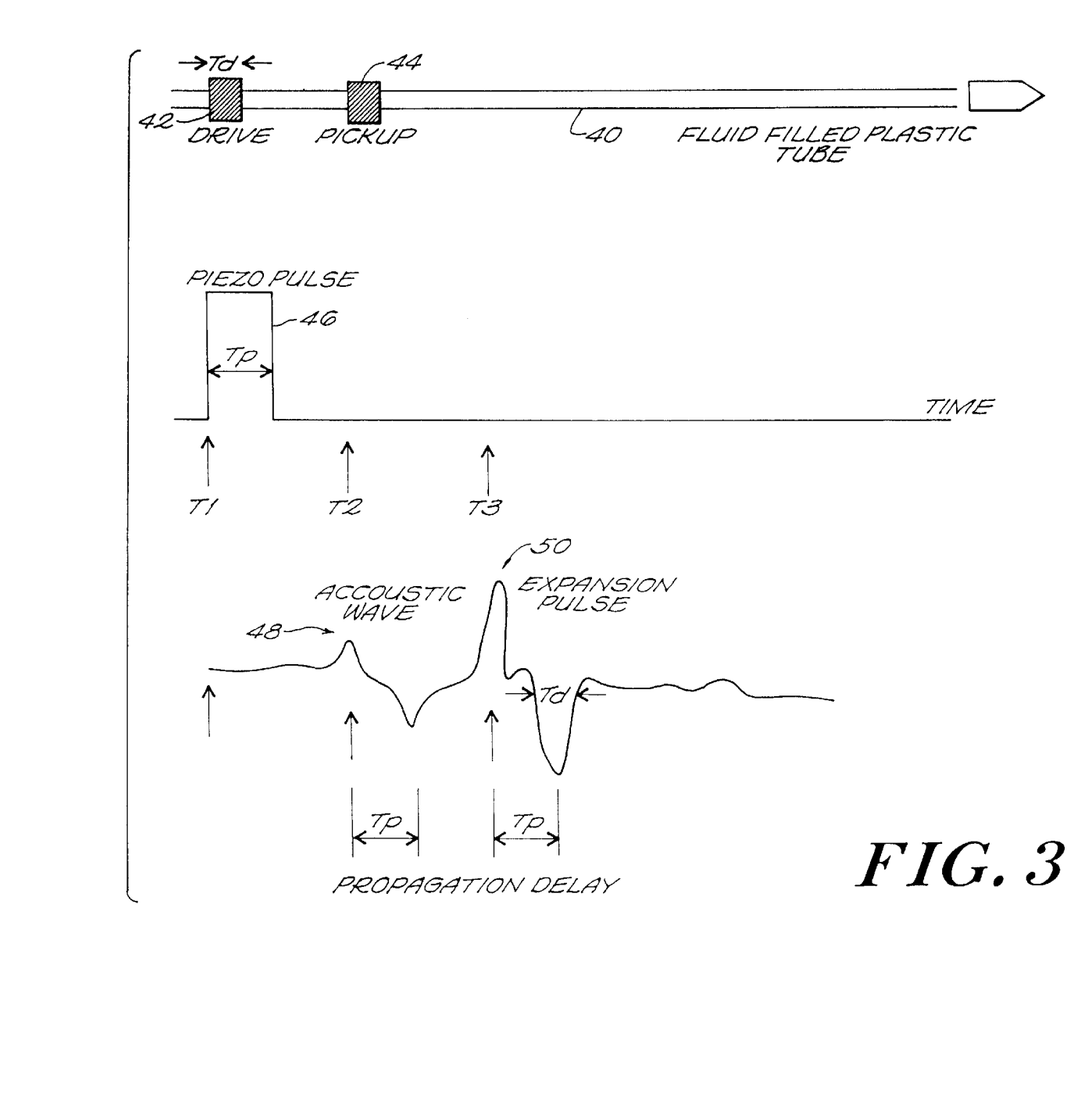
FIG. 3 is an illustration of fast and slow pulses produced upon activation of the transducer.
Figure 4:
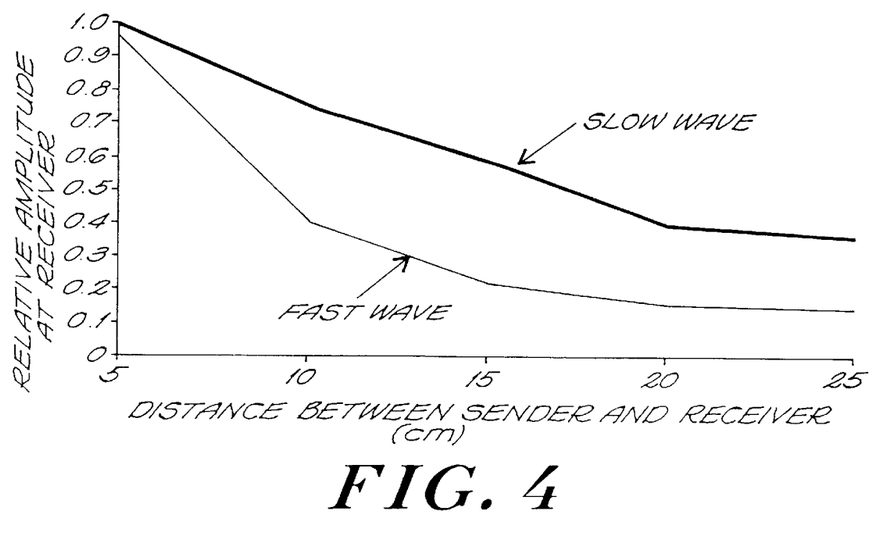
FIG. 4 is a graph illustrating the attenuation of the fast and slow pulses as a function of distance from the transducer.

In a preferred embodiment, the desired mechanism of propagation involves a radial expansion of the elastic fluid conduit which stores potential energy and the interchange of this stored energy with the kinetic energy of the fluid as the conduit wall collapses from its expanded state (some kinetic energy is also taken up by the conduit wall itself, although generally less than that consumed by the moving fluid). In order to verify that this mechanism of wave propagation is active and dominant, (referring to FIG. 3), a fluid conduit 40 was equipped with a first piezo transducer 42 as a sender and a second piezo transducer 44 as a receiver. The fluid conduit material was #24 extruded PTFE tubing (0.032 inch OD×0.020 inch ID) filled with water. Rectangular voltage pulses were applied to the sender piezo 42 and the transducer signal from the receiver piezo 44 was examined on an oscilloscope. Two distinct pulses arrived at the receiver for each pulse at the sender, as illustrated in FIG. 3. The first pulse 48 arrives at a wavespeed of approximately 1100 m/s while the second pulse 50 arrives later with a wave speed of approximately 600 m/s. The slower pulse is generally larger in amplitude than the faster pulse. When the experiment is repeated without the water present, only the faster pulse is observed. Thus, the faster pulse is due to a propagation mechanism in the fluid conduit material itself, while the slower pulse is due to a propagation mechanism involving both the fluid conduit and the liquid. Both pulses are significantly slower than the speed of sound in water which is 1490 m/s. The slower wavespeed is close to the wave speed predicted by the Moens-Kortweg solution which is based on the storage of energy in the elastic expansion of the fluid conduit and the change to kinetic energy of the fluid moving along the length of the conduit as the conduit constricts. For a thin walled elastic fluid conduit with an incompressible fluid, the Moens-Kortweg wavespeed is given by:

$$\text{Wavespeed} = \frac{1}{\sqrt{2}} \sqrt{\frac{tE}{R\rho}}$$

where t is the wall thickness of the fluid conduit, R is the radius, E is the elastic modulus of the fluid conduit material, and $\rho$ is the density of the fluid. In a further experiment, the distance between the send piezo 42 and receive piezo 44 was varied and the amplitude of the received pulses was recorded as a function of the distance between the piezo elements, with the results shown in FIG. 4. It was found that the fast wave was rapidly attenuated as it propagated along the fluid conduit, but the slow wave was more persistent.

These results help to understand aspects of the construction and function of the present invention. The primary mechanism for carrying energy from the piezo 20 to the nozzle 12 involves both the elastic fluid conduit 18 and the liquid. This wavespeed, in combination with the imposed frequency of oscillation of the piezo 20 can be used to compute the wavelength of the wave. For a preferred embodiment with a wavespeed of 600 m/sec and an applied frequency of 60 kilohertz, the wavelength is calculated to be 10 mm. The length of the piezo transducer 20 should preferably be less than or equal to half this wavelength in order to effectively transmit energy to the fluid conduit/liquid waveguide. However, a very short piezo has little energy to impart. Thus, for the preferred embodiment under discussion, a piezo length of 3–4 mm is appropriate. The nature of this coupling between the piezo 20 and the fluid conduit 18 can also serve to filter out harmonics of the intended frequency as such higher frequencies will not couple well to the fluid conduit 18. Second, the existence of two modes of wave travel, one in the fluid conduit alone, presents a possible problem as the two wavespeeds will result in constructive or destructive interference of a sinusoidal signal from the piezo 20 as they arrive at the nozzle 12 and the nature of the interference would depend on the precise distance between the piezo 20 and nozzle 12 as well as the frequency and wavespeeds of propagation. Fortunately, the faster wavespeed which travels only in the fluid conduit 18 is found to be of smaller amplitude, and has been shown to attenuate more rapidly with propagation distance. Further, the faster wave is easily attenuated by the application of a dissipative material (not shown) to the outside of the elastic fluid conduit 18. In the several current embodiments, the droplet generator terminates with a stainless steel or other rigid fixturing means which is in conformal contact with the Teflon conduit leading to the orifice seat and seal. In has been found that these contact areas alone are sufficient to dampen the effects of the fast wave.

Figure 5:
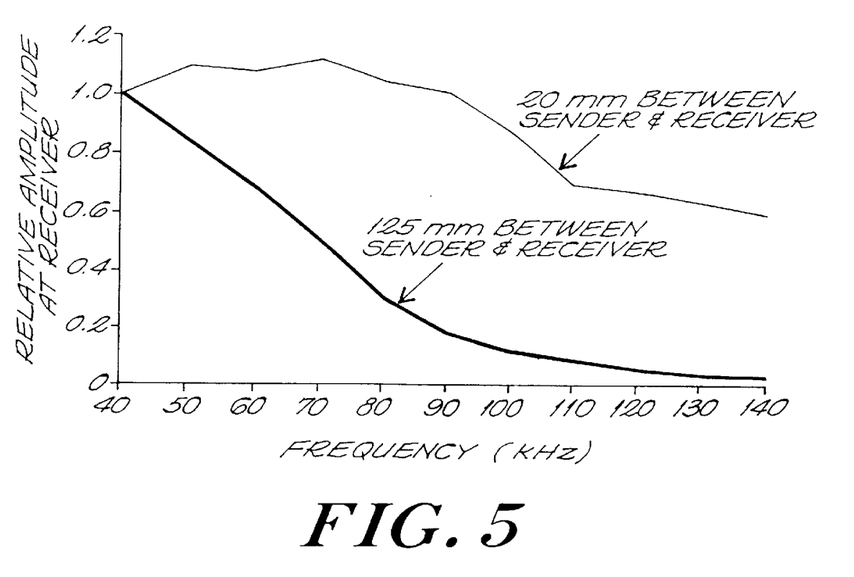
FIG. 5 is a graph illustrating the relative amplitude as a function of frequency for receivers spaced 20 mm and 125 mm from the transducer.

A similar test arrangement with a piezo sender and a piezo receiver was used to assess the ability of the fluid conduit/liquid system to sustain a wave at different frequencies by applying a sinusoidal excitation at different frequencies to the sender and measuring the magnitude of the signal at the receiver. Such frequency response data was taken a two distances (20 mm and 125 mm) between sender and receiver with the result shown in FIG. 5. In these tests, the fast wave was attenuated in the manner described above, leaving only the slower wave which propagates by combination of the fluid conduit and fluid. As may be seen, at both distances between sender and receiver, the transmission of the higher frequencies are attenuated with respect to the transmission of the lower frequencies. However, when the distance between sender and receiver is large, the attenuation is much more pronounced, clearly showing that it is the propagation along the length of fluid conduit which accounts for at least the majority of the attenuation.

These results help to explain the beneficial properties of the current invention in providing for consistent formation of droplets over a range of operation frequencies and with a range of fluids. The fundamental mode of energy transfer down the fluid conduit/liquid system does not depend on a resonance condition and hence is operative over a wide range of frequencies. The fact that higher frequencies are more rapidly attenuated is itself beneficial in that harmonics of the intended frequency will be filtered out before they reach the nozzle. Thus, if the piezo transducer 20 is vibrating with some harmonic content these higher harmonics will be attenuated and only the intended vibration will reach the nozzle 12. The need to provide for filtering also explains why it is beneficial to provide the piezo 20 at least some distance S from the nozzle 12. In a preferred embodiment, this minimum distance is 50 mm although it is recognized that longer or shorter minimum distances may apply in different embodiments. The minimum distance is also useful in attenuating the fast mode of wave propagation, leaving only the desired slower mode, as noted above. Finally, we can understand the nature of desired acoustic properties of the elastic fluid conduit/fluid system. It is preferred to have a fluid conduit/fluid system which allows the frequencies near to the Rayleigh frequency to propagate, but attenuates frequencies which are significantly higher and which might occur as harmonics of the Rayleigh frequency. Thus, a fluid conduit which significantly attenuates even the Rayleigh frequency is not preferred.

The droplet generator of the current invention allows for use of a broad range of inks or binders. Control may be exercised over all the wetted materials and, for example, the invention may be built with only inert polymers and ceramic orifices as wetted materials. Thus, a high degree of chemical resistance may be obtained. Slurries with high solids loading of abrasive materials may be jetted through the use of abrasion resistant materials in the construction. Further, the fluid is under a continuous, high velocity flow through narrow conduit, thus eliminating stagnation regions where particulates might settle. The absence of gaskets and seals of dissimilar materials in contact with the fluid stream facilitates the use of fluids which are subject to nucleation and precipitation. The absence of stagnation regions, high fluid velocity and absence of seals also simplifies cleaning procedures and change-overs from one ink to another ink. Indeed droplet generators of the type presently described have been used to jet different materials in sequence through a single nozzle without interrupted operation. Simplicity of design makes this device especially suited to applications where fluid integrity must be maintained as in medical and pharmaceutical and micro fabrication fields.

The droplet generator of the current invention does not depend on a resonance condition and may be operated over a broad range of frequencies with uniform and predictable droplet formation. Further, the precise acoustic properties of the fluid are not key to the function of the device and so, a particular droplet generator can tolerate temperature and composition changes of an ink and indeed can work with a variety of different fluids. Further, different orifice sizes and flowrates can be employed within a broad range without significant redesign of the device, as it is not a tuned resonant system.

It is a further aspect of the present invention to create a Droplet Generator which, by its design, is not susceptible to excitation to a resonance condition. For example, the wave initiated by the motion of transducer 20 travels both toward the nozzle 12 and toward the reservoir 16. In a preferred embodiment, the energy of the wave which travels toward the reservoir 16 is absorbed or dissipated before it reaches the end of the conduit at the reservoir and hence no wave may be reflected back toward the nozzle. Such absorption may be provided by providing a long length of conduit between transducer and reservoir. Alternatively, a section of conduit made of a material with highly dissipative properties may be coupled to the conduit 18 between the transducer and the reservoir, taking care to minimize reflections. Alternatively, a filter may be pressed in to the lumen of the conduit 18 between the transducer and the reservoir so as to damp the motion of the fluid and thereby to absorb the energy from the wave.

Figure 6:
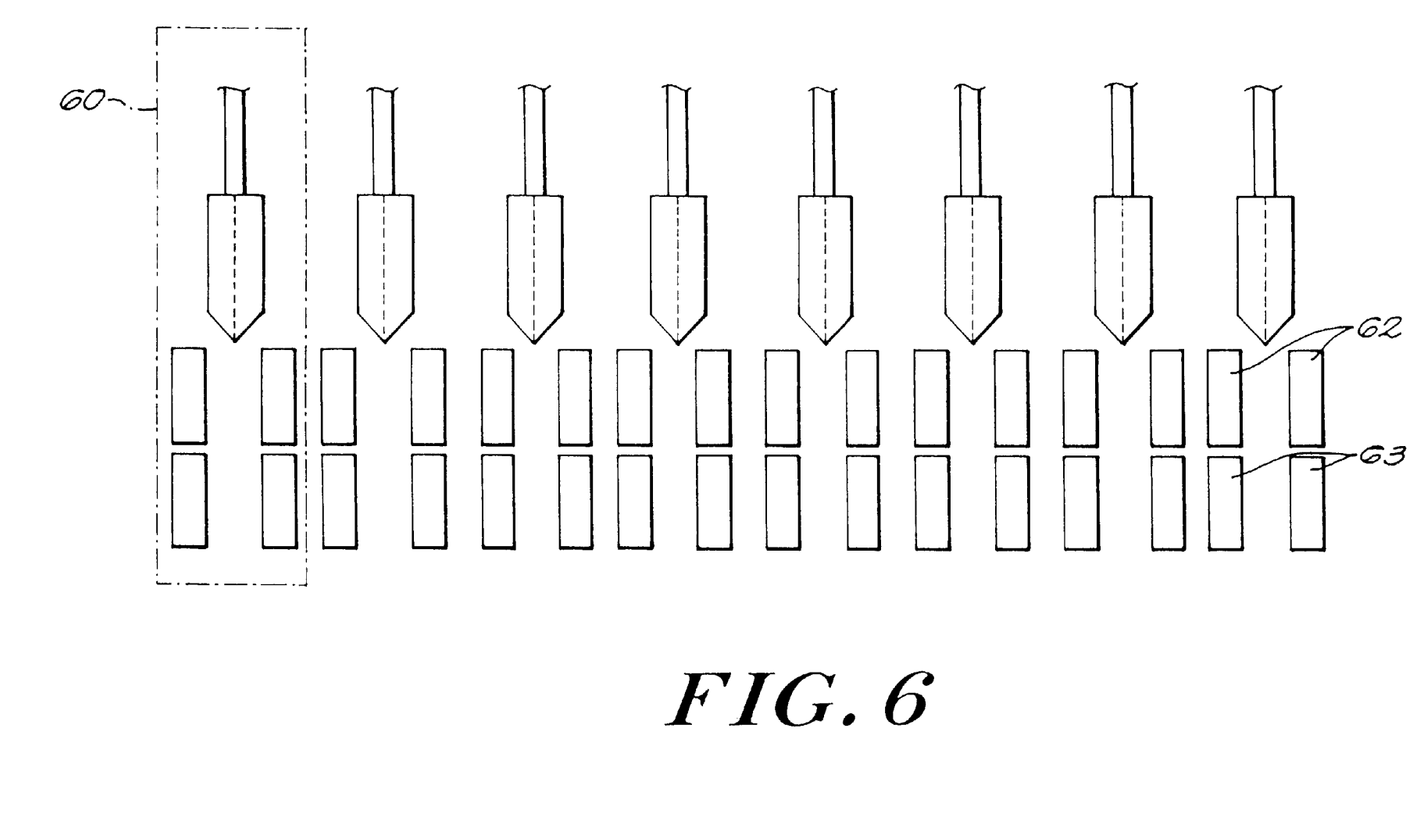
FIG. 6 is a diagrammatic illustration of a printhead assembly incorporating a plurality of droplet generators of the type illustrated in FIG. 1.

The presently disclosed droplet generator is extremely light in weight and compact. Droplet generators 60 may be ganged in single row arrays as shown in FIG. 6 or in arrays comprising multiple rows of droplet generators. Building arrays by the assembly of individual droplet generators 60 offers numerous advantages. It is a modular approach and wider arrays can be fabricated simply by adding more droplet generators, each of which functions independently and without significant "cross-talk". No extensive redesign due to complex acoustical considerations such as those encountered in a resonant system would be needed. As there are no massive metal resonator assemblies the assembled array can be extremely light in weight, a property useful in an application where the printhead must move at high speeds. The presently disclosed droplet generator makes it easy to create an array where different jets are dedicated to different ink materials. In fact, it is possible to construct an array where each jet has a different fluid supply, materials of construction, orifice size, jet velocity and droplet frequency. However, as the number of jets increase, practical considerations will dictate grouping jets according to intended use at the printhead. For example, jets could be grouped according to fluid use and flow rate with distribution manifolding at the printhead in order to reduce the number of fluid lines in the umbilical. Similarly, jets could be clustered according to orifice size in order to share common droplet charge and deflection geometries. The tubular and flexible nature of this droplet generator facilitates this kind of independence. Droplet steering may be achieved via charge plates 62 and deflection plates 63 in a manner known in the art.

Service of an array comprised of a multiplicity of individual droplet generators is also simplified as an individual jet may be removed and replaced even while the others continue to operate. For example, one method is to provide each droplet generator with its own capillary fluid conduit which extends from the fluid source to the nozzle. The length of this fluid conduit is sufficient to allow for the use of this fluid conduit as the umbilical serving the droplet generator and this length might typically be in the range of 2–5 meters. The inner diameter of the fluid conduit is sized so as to provide a drop in fluid pressure along its length which lies in a range of approximately 10–20% of the pressure required at the nozzle itself. A higher pressure drop along the capillary fluid conduit would create excessive pressure requirements at the reservoir. However, some significant pressure drop is required so that when a droplet generator is removed, the fluid friction in the capillary fluid conduit itself will serve to limit the flow to a manageable rate until a new droplet generator is put in place. For example, if a 50 micron diameter nozzle requires a pressure of 30 psi to create a desired flow rate of 1 cc/minute, the capillary fluid conduit is sized so that at this flow rate, the pressure drop along the length is, for example, 5 psi. Thus, the pressure required at the fluid source has increased a manageable amount (from 30 to 35 psi). However, when a droplet generator is removed from the end of the capillary fluid conduit, the full 35 psi of pressure at the fluid source will be dropped along the length of the capillary fluid conduit, resulting in a flow rate of approximately 7 cc/minute at the end of the fluid conduit. This amount is large enough to provide effective flushing of the fluid conduit, but small enough that the other droplet generators can continue to function during the replacement operation.

The three aspects of construction of the presently described droplet generator, i.e., the fluid conduit, the transducer and the nozzle, may each take different forms.

The fluid conduit may be fabricated of an elastic material such as Teflon (TFE, FEP, KYNAR, PTFE), HDPE, polypropylene, polyamide or any other suitable non-resonant elastically deformable material.

The fluid conduit need not be of a homogeneous material. For example, a composite material such as a polymer with a ceramic or glass fiber or particulate filler may provide the appropriate acoustical properties. The fluid conduit can also consist of a lamination of layers. For example, a fluid conduit consisting of layers of different polymers may confer benefits of chemical immunity from the inner layer with the ability to tailor the acoustical properties by design of the outer layer.

Additionally, the fluid conduit need not be round. For example a fluid conduit of elliptical cross section can also sustain the propagation of a wave. In this case, the fluid conduit wall may need to be stiffer than the comparable fluid conduit with a round cross section as the energy storage in the deformed fluid conduit will not be due to a tensile hoop stress as in a round fluid conduit, but may have a significant component of bending stresses within the fluid conduit wall. Thus, a fluid conduit made of metal such as stainless steel might be usefully employed as, for example, an elliptical cross-section.

Figures 7, 7A:
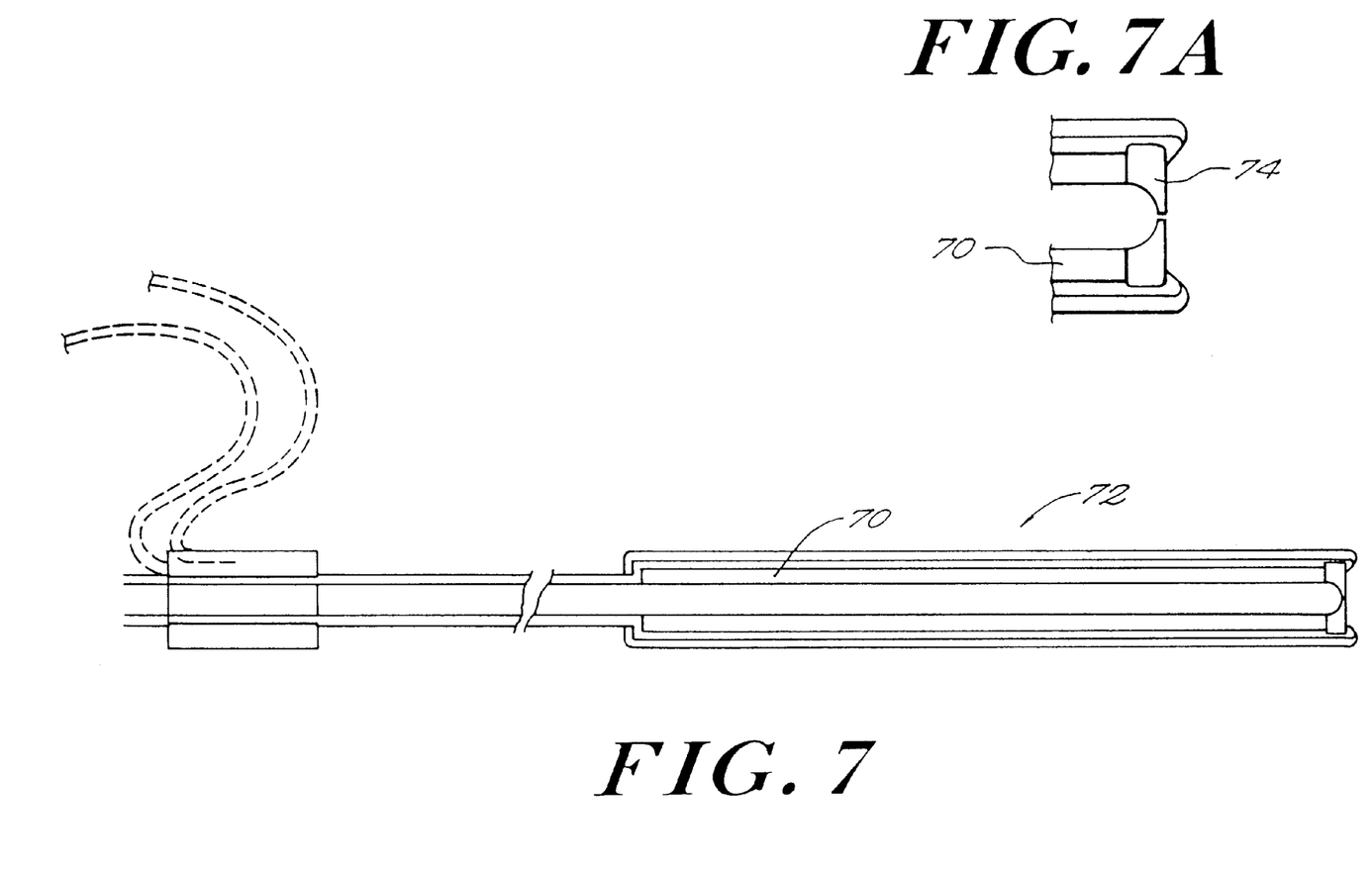
FIG. 7 is an diagrammatic view of an alternative nozzle assembly for use in the droplet generator of FIG. 1.
FIG. 7a is an enlarged diagrammatic view of the forward portion of the nozzle assembly of FIG. 7.

The nozzle may be fabricated in several alternates to the preferred embodiment. In FIGS. 7 and 7a, the 0.054 inch diameter counterbore section and associated flared Teflon fluid conduit section are extended in order to include a short orifice alignment core. In this embodiment, a stainless steel insert 70, being in concentric alignment with the nozzle body 72, provides an alignment seat against which the ruby disk 74 can be swaged in its TFE gasketed assembly. Note that the ID of this insert matches that of the TFE capillary as it exits the nozzle assembly and also matches the diameter of the hemisphere formed in the ruby disk 74 leading to the orifice. In the present embodiment the diameter of the hemisphere is 0.020 inch.

Figures 8, 8A:
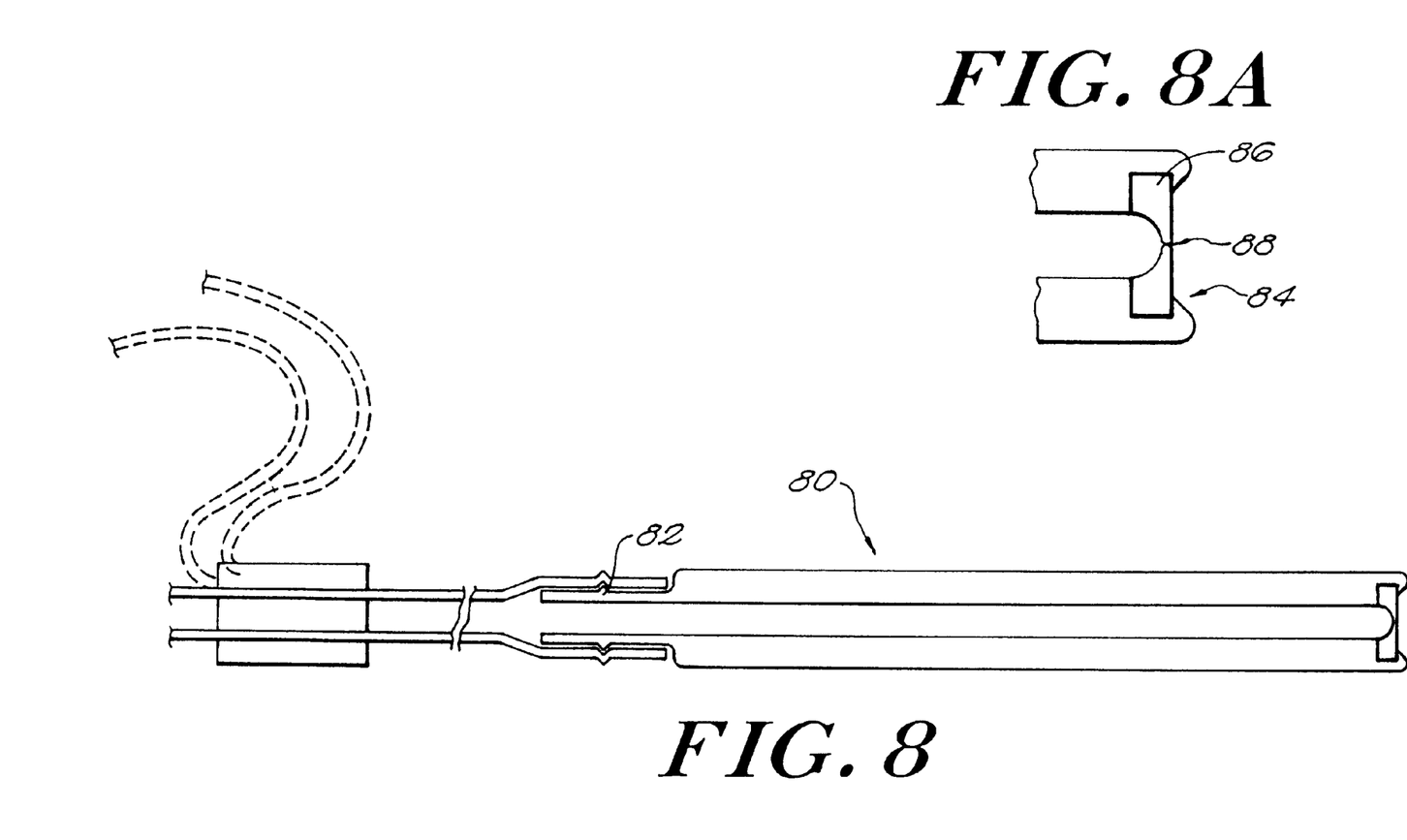
FIG. 8 is another diagrammatic view of an alternative nozzle assembly for use in the droplet generator of FIG. 1.
FIG. 8a is an enlarged diagrammatic view of the forward portion of the nozzle assembly of FIG. 8.

Alternately, as depicted in FIGS. 8 and 8a, the entire nozzle 80 may be machined from stainless steel, having a barb 82 at one end for capillary attachment and a counterbore recess 84 at its termination into which the ruby disk 86 having an orifice 88 is swaged and fluid sealed.

Figure 9:
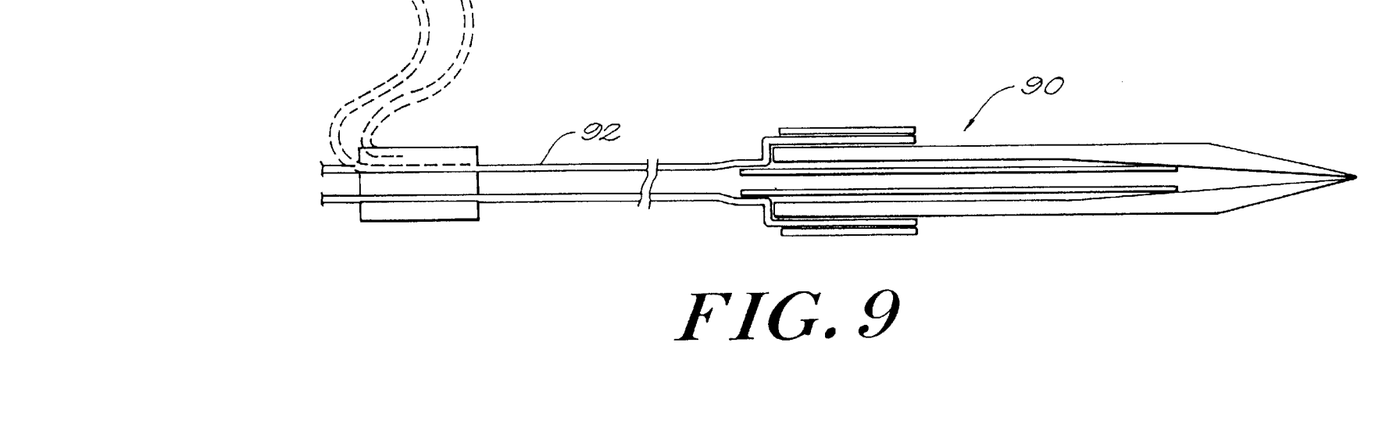
FIG. 9 is another diagrammatic view of an alternative nozzle assembly for use in the droplet generator of FIG. 1.
Figure 9A:
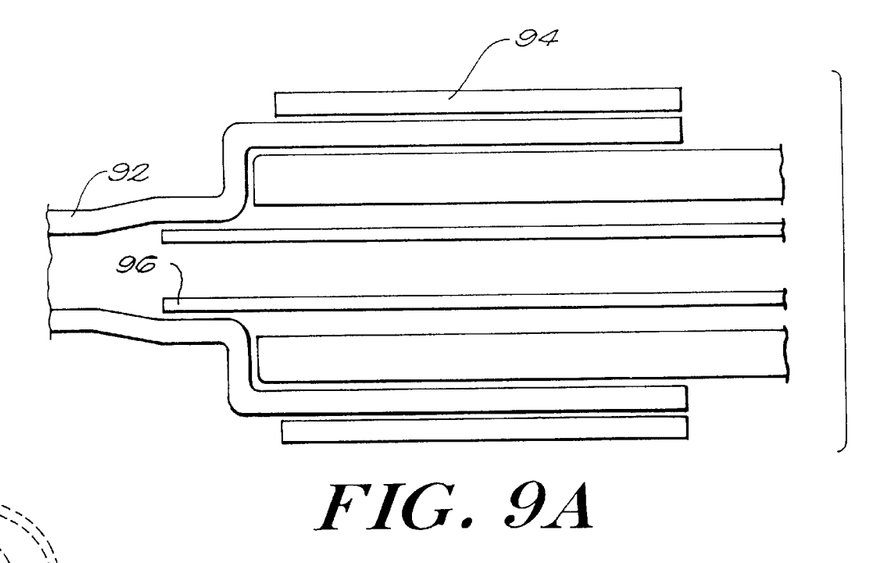
FIG. 9a is an enlarged diagrammatic view of the forward portion of the nozzle assembly of FIG. 9.

Alternately, as depicted in FIGS. 9 and 9a, an alumina nozzle 90 made for wire bonding in VLSI fabrication may be adapted for use as a jetting orifice, and fluid sealed to the Teflon capillary fluid conduit 92 with a stainless compression collar 94. In this embodiment a short transition element 96 is included in order to maintain a generally uniform ID. Note that in all embodiments, care is given to the elimination of abrupt transitions in the fluid path between the transducer and orifice to avoid reflections that might be introduced as a consequence of such transitions and to transmit as much energy as possible to the orifice.

The nozzle may also be fabricated as an integral element of the conduit, for example be injection molding of a length of conduit with a small orifice in one, otherwise closed end.

Figure 10:
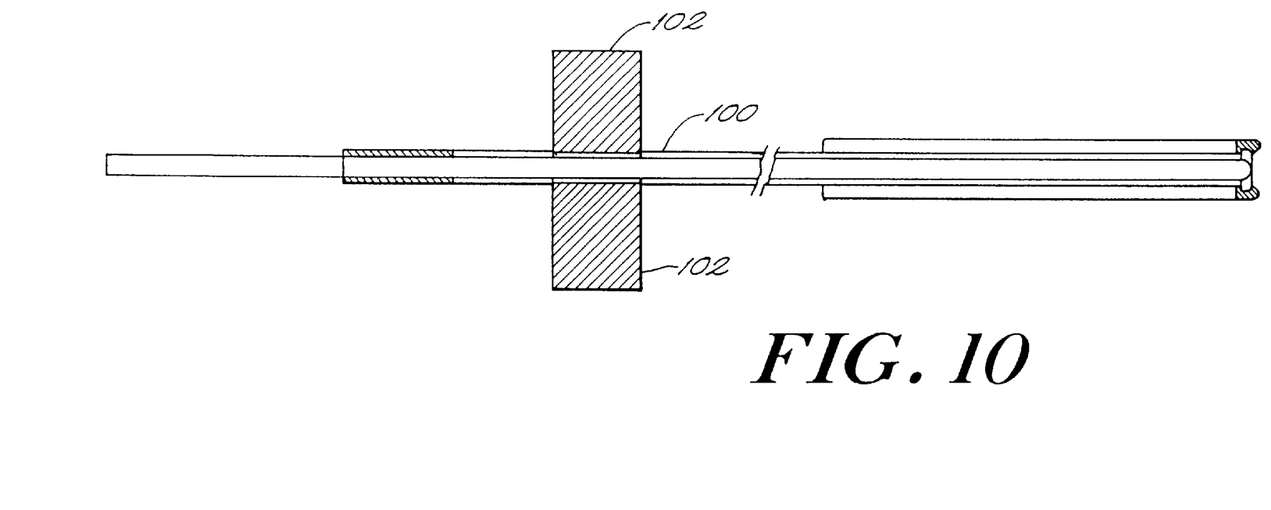
FIG. 10 is a diagrammatic view of another embodiment of a droplet generator in accordance with the present invention including piezo-electric transducers disposed on opposing sides of the elastic fluid conduit.
Figure 10A:
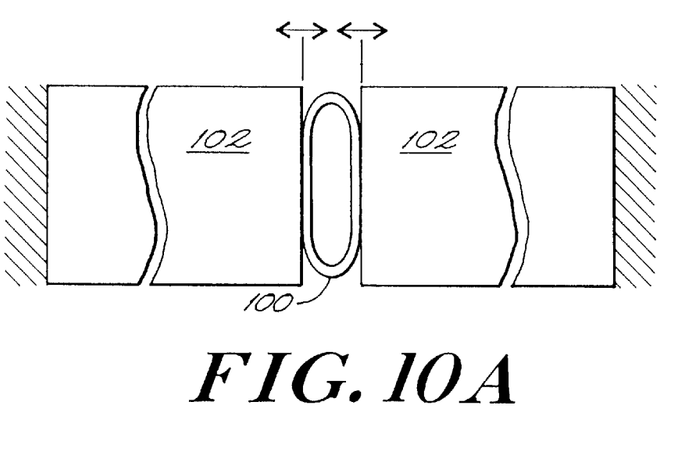
FIG. 10a is an enlarged diagrammatic cross-sectional view illustrating the piezo-electric transducers of FIG. 10 disposed on opposing sides of the elastic fluid conduit.

The piezo transducer may also take the form of rectangular elements which pinch the fluid conduit across a diameter as illustrated in FIGS. 10 and 10a. In this embodiment, as depicted, it is preferred to pre-compress the fluid conduit 100 between the flat surfaces of the piezo transducers 102 and to have the motion of the piezo transducers applied to this precompressed fluid conduit 100. This is done in order to allow a small motion of the piezo elements to effect a substantial change in the cross sectional area of the fluid conduit 100 and therefore to expel a substantial volume of liquid which acts to initiate the propagation of the desired wave motion.

It is further appreciated that other forms of transducers may be employed in place of piezo elements, such as magnetorestrictive elements or electrorestrictive elements or any other suitable transducer which serves to induce a suitable wave within the fluid conduit. For example, small particles of magnetic particles may be embedded in the fluid conduit. The application of a transient magnetic field in the vicinity of the fluid conduit, will act to compress the material of the fluid conduit and initiate the desired wave motion.

The wave motion may alternately be stimulated by inducing a motion in the fluid itself. For example, an electrically conductive fluid can be stimulated magnetohydrodynamically. A velocity variation in the fluid will in turn initiate the wave motion which travels down the combination of conduit and fluid.

Stimulation, whether of the fluid conduit or the fluid, may be provided at a number of sites along the length of the tube, so long as the waves initiated by the several stimulation sites add constructively to create a larger wave which propagates toward the nozzle.

It is also possible to excite the transducer with a variety of periodic signals other than a simple sinusoid and such alternate periodic signals may be found to provide greater latitude in the formation of regular droplet stream by shaping the nature of the break-off of the stream. For example, a square wave or triangle wave excitation can be used. Further a periodic signal which is the result of the addition of two sine waves, one at the fundamental and the second at a harmonic frequency is also possible, with independent specification of the relative amplitude of the two sine waves and their relative phase. It will be understood that the high frequency filtering aspect of the current invention will limit the harmonic content of a non-sinusoidal signal, however, the lower harmonics such as the 2nd and 3rd harmonic will still have sufficient energy transfer to the nozzle to allow for their use. While the present invention will allow for the passage of some fraction of a harmonic of desired amplitude and phase relationship to the fundamental, it will still provide some filtering against uncontrolled harmonic content.

The transducer may be coupled to the fluid conduit by interference fit in the manner described above. Alternatively, the transducer may be adhesively bonded to the fluid conduit, or bonded by any other means known in the art.

A filter may be provided in the elastic fluid conduit or at the entrance to it so as to reduce the probability of failure of the nozzle during use. It should be recognized that it is preferable not to locate the filter between the transducer and the nozzle as such disposition may tend to damp out the wave propagation through the fluid within the fluid conduit.

It should be appreciated that variations and other embodiments of the above described droplet generator and printhead assembly, as well as variations on the method for utilization of such droplet generator and printhead assembly will be apparent to those of ordinary skill in the art based upon the disclosure provided herein. Accordingly, the embodiments described herein are to be viewed merely as exemplary of the present invention and the invention is to be viewed as limited solely by the scope and spirit of the appended claims.

What is claimed is:

1. A continuous droplet generator comprising:
   an elongated elastically deformable fluid conduit for carrying fluid downstream to a first end of said conduit from a second end of said conduit;
   a nozzle in fluid communication with said first end of said fluid conduit, said nozzle terminating downstream in an orifice for emitting said fluid as a continuous stream having a diameter D and a velocity V; and
   a transducer spaced along said fluid conduit upstream from said nozzle and operative upon activation to cause a periodic disturbance that travels downstream by means of radial expansion and contraction of said fluid conduit, which disturbance influences said stream to break up into a stream of droplets, as said fluid stream is emitted from said orifice.

2. The droplet generator of claim 1 wherein said transducer is operative upon activation to cause said disturbance to travel downstream also by means of interaction of said fluid with said radial expansion and contraction of said conduit.

3. The droplet generator of claim 2, said interaction of said fluid with said radial expansion and contraction of said conduit comprising the interchange of stored potential energy of said expanded conduit with kinetic energy of said fluid as said fluid conduit wall collapses from an expanded state.

4. The droplet generator of claim 1 wherein said transducer is disposed in confronting relation with said fluid conduit.

5. The droplet generator of claim 1 wherein said transducer comprises a cylindrical transducer disposed coaxially around said fluid conduit.

6. The droplet generator of claim 5 wherein said cylindrical transducer comprises a piezoelectric transducer.

7. The droplet generator of claim 4 wherein said transducer comprises at least one generally rectangular transducer.

8. The droplet generator of claim 1 wherein said fluid conduit comprises a flexible fluid conduit.

9. The droplet generator of claim 1 wherein said fluid conduit comprises a teflon fluid conduit.

10. The droplet generator of claim 1 wherein said fluid conduit comprises an HDPE fluid conduit.

11. The droplet generator of claim 1 wherein said fluid conduit comprises a polypropylene fluid conduit.

12. The droplet generator of claim 1 wherein said fluid conduit comprises a polyamide fluid conduit.

13. The droplet generator of claim 4 wherein said transducer is disposed at least 50 mm upstream said fluid conduit from said nozzle.

14. The droplet generator of claim 1 wherein said fluid conduit has an inner surface having a non-circular cross section along at least a portion of said fluid conduit.

15. The droplet generator of claim 14 wherein said non-circular cross section comprises a generally elliptical cross section.

16. The droplet generator of claim 1 further comprising a fluid reservoir in fluid communication with said second end of said fluid conduit.

17. The droplet generator of claim 16 wherein said fluid reservoir comprises a pressurized fluid reservoir.

18. The droplet generator of claim 1 further comprising a waveform generator operative to activate said transducer to periodically induce said disturbance to influence droplet formation at a frequency f.

19. The droplet generator of claim 18 wherein said waveform generator is operative to activate said transducer with a generally sinusoidal waveform to periodically induce said disturbance.

20. The droplet generator of claim 18 wherein said waveform generator is operative to induce said disturbance at a frequency approximating the Rayleigh frequency for said stream of fluid.

21. The droplet generator of claim 18 wherein said waveform generator is operative to activate said transducer with at least a first sinusoidal waveform at a fundamental frequency and a second sinusoidal waveform at a harmonic of said fundamental frequency.

22. The droplet generator of claim 21 wherein said waveform generator permits the phase of said second waveform to be adjusted with respect to the phase of said first waveform.

23. The droplet generator of claim 21 wherein said elastically deformable fluid conduit has properties selected to attenuate the propagation of disturbances to said nozzle having a frequency greater than the third harmonic of said frequency f of droplet formation, to a degree of attenuation significantly greater than that experienced by disturbances which have a frequency f.

24. The droplet generator of claim 18 wherein said elastically deformable fluid conduit has properties selected to permit propagation of said disturbance at a frequency equal to the frequency f of droplet formation with a degree of attenuation of said disturbance during propagation toward said nozzle less than would eliminate said disturbance's influence on the break-up of said stream into droplets.

25. The droplet generator of claim 18 wherein said elastically deformable fluid conduit has properties selected to attenuate the propagation to said nozzle of disturbances which have a frequency significantly higher than said frequency f of droplet formation, to a degree of attenuation significantly greater than that experienced by disturbances which have a frequency f.

26. The droplet generator of claim 18 wherein said predetermined distance is selected to provide for attenuation at said nozzle of disturbances of frequencies significantly higher than the frequency f, which attenuation is significantly greater than any attenuation experienced at said orifice of disturbances which have a frequency equal to f.

27. The droplet generator of claim 1 further comprising:
an attenuating material in contact with an outside surface of said fluid conduit along at least a portion of the length of the fluid conduit, said material being selected to provide attenuation at said nozzle of frequencies significantly above the frequency of droplet formation.

28. The droplet generator of claim 1, said conduit being constructed of a material such that, when said periodic activation has a fundamental frequency f, disturbances that are harmonics of said fundamental frequency experience significantly greater attenuation in their passage to the orifice than do disturbances of the fundamental frequency.

29. The droplet generator of claim 1, wherein said disturbance propagates downstream at a velocity z, and influences said stream to break up into droplets at a frequency f, and said transducer has a length, which is disposed in abutting relation with said fluid conduit and said length is less than said velocity z divided by said frequency f.

30. The droplet generator of claim 1, further wherein said disturbance influences said stream to break up into droplets at a frequency f and wherein none of: said nozzle, said conduit, said fluid and any combination thereof, resonates at a frequency that is substantially equal to said frequency f.

31. A continuous droplet generator comprising:
an elongated elastically deformable fluid conduit for carrying a stream of fluid, said fluid conduit having a first end and a second end and being non-resonant over a specified frequency range;
a nozzle in fluid communication with said first end of said fluid conduit, said nozzle terminating in an orifice; and
a transducer, operative upon activation to cause a disturbance in said fluid conduit and said stream at a location along said fluid conduit a predetermined distance from said nozzle, wherein said transducer has a length which is disposed in abutting relation with said fluid conduit and said length is less than the velocity of propagation of the disturbance toward the nozzle divided by the frequency of the highest frequency component of the disturbance which is desired at said nozzle.

32. A method for continuous droplet generation comprising the steps of:
causing a fluid to flow downstream along an elongated, elastically deformable fluid supply conduit between a fluid supply and a nozzle that terminates in an orifice, such that said fluid exits from said orifice in a continuous stream, having a velocity V; and
activating a transducer disposed at a location along said fluid supply conduit between said fluid supply and said nozzle, spaced upstream from said nozzle, to induce a disturbance that propagates downstream, by means of radial expansion and contraction of said fluid conduit, to said nozzle, and causes a disturbance in said fluid to propagate outside of and downstream from said orifice, to influence said continuous stream of fluid emitted from said nozzle to break up into a stream of droplets.

33. The method of claim 32 wherein said activating step further comprises the step of deforming said elastically deformable fluid conduit upon activation of said transducer to induce said disturbance to propagate downstream.

34. The method of claim 33 wherein said fluid conduit has a fluid conduit wall and said deforming step further comprises the step of periodically displacing said fluid conduit wall upon activation of said transducer to periodically induce said disturbance.

35. The method of claim 32 wherein said activating step further comprises the step of energizing a cylindrical piezoelectric transducer coaxially disposed around said fluid conduit so as to deform said fluid conduit upon activation of said transducer.

36. The method of claim 32 wherein said activating step further comprises the step of periodically activating said transducer to periodically induce said disturbance.

37. The method of claim 32 wherein said activating step further comprises the step of activating said transducer with a sinusoidal waveform to periodically induce said disturbance.

38. The method of claim 32 wherein said activating step further comprises the step of activating said transducer with a waveform having at least a first frequency and a second frequency which comprises a harmonic of said first frequency to periodically induce said disturbance.

39. The method of claim 32 wherein said activating step further comprises the step of activating said transducer with a waveform having at least a first frequency and a second frequency which comprises the second harmonic of said first sinusoidal frequency to periodically induce said disturbance.

40. The method of claim 32 wherein said activating step comprises the step of inducing a disturbance which also propagates by means of interaction of said fluid with said radial expansion and contraction of said fluid conduit to influence the break-up of said stream of fluid emitted from said nozzle.

41. The method of claim 40, said interaction of said fluid with said radial expansion and contraction of said conduit, that arises during said step of inducing a disturbance, comprising the interchange of stored potential energy of said expanded conduit with kinetic energy of said fluid as said fluid conduit wall collapses from an expanded state.

42. The method of claim 32, said step of activating a transducer further comprising the step of activating said transducer to induce a disturbance having a fundamental frequency f, which propagates downstream such that any disturbances that are harmonics of the fundamental frequency experience significantly greater attenuation in their passage to the orifice than do disturbances of the fundamental frequency.

43. The method of claim 32, said step of activating a transducer further comprising the step of activating said transducer to induce a disturbance having a fundamental frequency f, that propagates downstream, further wherein none of: said said nozzle, said conduit, said fluid and any combination thereof other than said transducer resonates near said frequency f.

44. A method for continuous droplet generation comprising the step of:

causing a fluid, having a density $\rho$, to flow downstream along an elongated, elastically deformable fluid supply conduit, having a wall thickness t, a radius R and an elastic modulus E, between a fluid supply and a nozzle that terminates in an orifice, such that said fluid exits from said orifice in a continuous stream, having a velocity V; and activating a transducer disposed at a location along said fluid conduit between said fluid supply and said nozzle to induce a disturbance in said fluid conduit at a predetermined distance from said nozzle, wherein said disturbance propagates as a wave downstream by means of said fluid conduit to said nozzle at a speed z that is approximately equal to $$\frac{1}{\sqrt{2}}\sqrt{\frac{tE}{R\rho}}$$

to influence the break-up of said stream of fluid emitted from said nozzle.

45. A method for continuous droplet generation comprising the steps of:

causing a fluid to flow through a fluid conduit between a fluid supply and a nozzle and emitting said fluid as a continuous stream from said nozzle; and producing a disturbance having a frequency f in said fluid conduit at a location along said fluid conduit a predetermined distance from said nozzle to influence the break-up of said stream of fluid emitted from said nozzle without inducement of resonance in either said fluid conduit or said fluid or any combination thereof.

46. A printhead comprising:

a plurality of continuous droplet generators, at least two of said plurality of droplet generators each comprising:

an elongated elastically deformable fluid conduit for carrying fluid downstream to a first end of said conduit from a second end of said conduit;

an orifice in fluid communication with said first end of said fluid conduit, said orifice for emitting said fluid as a continuous stream; and a transducer spaced along said fluid conduit upstream from said orifice and operative upon activation to cause a periodic disturbance that travels downstream by means of radial expansion and contraction of said fluid conduit, which disturbance influences said fluid stream to break up into a stream of droplets, as said fluid stream is emitted from said orifice.

47. The printhead of claim 46 wherein said orifices are aligned in at least one row.

48. The printhead of claim 47 wherein said orifices within each of said at least one row are spaced apart by a predetermined distance.

49. The printhead of claim 46 wherein said droplet generator orifices are aligned in an array.

50. A continuous droplet generator comprising:

an elongated elastically deformable fluid conduit for carrying a stream of fluid, said fluid conduit having a first end and a second end and being non-resonant over a specified frequency range R;

a nozzle in fluid communication with said first end of said fluid conduit, said nozzle terminating in an orifice; and a transducer, operative upon activation to cause a disturbance having a frequency f within said range R, in said fluid conduit at a location along said fluid conduit a predetermined distance from said nozzle, wherein said transducer has a length which is disposed in abutting relation with said fluid conduit and said length is less than the velocity of propagation of the disturbance toward the nozzle divided by said frequency f.

51. A continuous droplet generator comprising:

an elongated elastically deformable fluid conduit, having a wall thickness t, a radius R and an elastic modulus E, for carrying fluid having a density $\rho$, downstream to a first end of said conduit from a second end of said conduit, such that said fluid exits from said first end in a continuous stream;

a nozzle in fluid communication with said first end of said fluid conduit, said nozzle terminating downstream in an orifice for emitting said fluid as said continuous; and a transducer spaced along said fluid conduit upstream from said nozzle and operative upon activation to cause a periodic disturbance that travels downstream to said nozzle at a speed z that is approximately equal to $$\frac{1}{\sqrt{2}}\sqrt{\frac{tE}{R\rho}},$$

which disturbance influences said stream to break up into a stream of droplets, as said fluid stream is emitted from said orifice.

52. The droplet generator of claim 51, said conduit having properties to significantly attenuate any disturbances that have a speed significantly greater than said speed z, such that greater speed disturbances do not adversely affect the break up of said stream into droplets.

* * * * *